3,057,801
LUBRICATING OIL COMPOSITIONS CONTAINING VISCOSITY INDEX IMPROVING AGENTS
Donovan R. Wilgus, Richmond, Calif., assignor, by mesne assignments, to the United States of America as represented by the United States Atomic Energy Commission
No Drawing. Original application Nov. 12, 1958, Ser. No. 773,176, now Patent No. 2,999,120, dated Sept. 5, 1961. Divided and this application June 6, 1960, Ser. No. 33,946
6 Claims. (Cl. 252—59)

This invention relates to new compositions of matter having improved viscosity index characteristics; in particular, this invention is directed to new compositions of matter which are effective to improve the viscosity-temperature characteristics, that is, the viscosity index (V.I.), of lubricating oil compositions.

This patent application is a division of patent application Serial No. 773,176, filed November 12, 1958, now Patent Number 2,999,120, issued Sept. 5, 1961.

The greater proportion of oils obtainable by refining processes and useful as base oils for lubricating oil compositions have wide variations in viscosity characteristics with changes in temperature. They do not have agents specifically incorporated therein for the purpose of imparting reduced changes in viscosity with changes in temperature. That is, at a particular temperature, a lubricating oil may be quite viscous, while at higher temperatures the lubricating oil may have a viscosity of a fluid such as kerosene. In order that the viscosity of a lubricating oil composition will not change rapidly with changes in the temperature of an internal combustion engine, for example, numerous additives have been designed to modify the viscosity-temperature characteristics of lubricating oils. The changes in the viscosity occurring with variations in temperature are kept at a minimum.

It is a primary object of this invention to provide new lubricating oil compositions containing new V.I. improving agents.

In accordance with this invention, it has been discovered that lubricating oil compositions are improved by incorporating therein new viscosity index improving agents, which are obtained by treating certain particular alpha, omega-diaryl alkanes with anhydrous aluminum chloride. The new viscosity index improving agents are the products obtained by treating alpha, omega-diphenyl alkanes with aluminum chloride.

The present invention comprises broadly the treatment of alpha, omega-diaryl alkanes with anhydrous aluminum chloride to produce oil soluble products which are useful as V.I. improvers for lubricating oil compositions, including lubricating oil compositions used in an atmosphere of nuclear radiation.

The alpha, omega-diaryl alkanes are represented by the formula

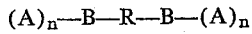

$(A)_n$—B—R—B—$(A)_n$ wherein R is a saturated hydrocarbon radical, including an aliphatic radical, containing from 6 to 12 carbon atoms; B is an aromatic radical; A is a hydrocarbon substituent on the aromatic nucleus containing from 1 to 8 carbon atoms; and $n$ is a number 0 to 3.

For purposes of this invention, it is preferred that R is an aliphatic radical containing from 6 to 12 carbon atoms, B is a phenyl radical, A is a saturated hydrocarbon radical containing from 1 to 8 carbon atoms, and $n$ is a number from 0 to 3.

The R radicals include the divalent radicals obtained from hexane, heptane, octane, nonane, decane, dodecane, etc.

The B radicals include the following radicals: phenyl, biphenyl, naphthyl, tetralin, etc.

The A radicals include methyl, ethyl, propyl, isopropyl, butyl, tert-butyl, pentyl, hexyl, sec-hexyl, etc.

The alpha, omega-diaryl alkanes are exemplified by 1,6-diphenylhexane; 1,7-diphenylheptane; 1,8-diphenyloctane; 1,9-diphenylnonane; 1,10-diphenyldecane; 1,9-bis(isopropylphenyl) nonane; 1,9-bis(n-butylphenyl) nonane; 1,9-bis(sec-butylphenyl) nonane; 1,9-bis(tert-butylphenyl) nonane; 1,6-bis(sec-hexylphenyl) hexane; 1,9-bis(1,2,3,4-tetra-hydronaphthyl) nonane; 1,9-bis(biphenyl) nonane, etc. When the aromatic radicals are phenyl radicals, the phenyl nucleus may be substituted with from 1 to 3 alkyl groups, such alkyl groups being on one or both of the benzene rings. Such alkyl substituents may be exemplified by n-propyl, isopropyl, n-butyl, isobutyl, sec-butyl, tert-butyl, amyl, etc.

Preferably, the alpha, omega-diaryl alkanes are alpha, omega-diphenyl alkanes, wherein the alkane radicals contain from the 6 to 12 carbon atoms, and the phenyl nucleus, in each instance, is unsubstituted.

The anhydrous aluminum chloride which is used in the formation of the viscosity index agents according to this invention is used in amounts of 8 mol percent to 80 mol percent, based on the alpha, omega-diaryl alkane. It is preferred to use from 8 mol percent to about 10 mol percent of anhydrous aluminum chloride per mol of alpha, omega-diaryl alkane.

A small amount of chloroform may be used with the aluminum chloride, for example, from about 10 mol percent to about 50 mol percent or greater, based on the aluminum chloride.

Other acid catalysts which can be used include $AlBr_3$, etc.

Lubricating oils which can be used as base oils include a wide variety of lubricating oils, such as naphthenic base, paraffin base, and mixed base lubricating oils, other hydrocarbon lubricants, e.g., lubricating oils derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, dicarboxylic acid esters (such as those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethyl hexyl alcohol, dodecyl alcohol, etc.), liquid esters of acids of phosphorus, alkyl benzenes (e.g., monoalkyl benzene such as dodecyl benzene, tetradecyl benzene, etc.), and dialkyl benzenes (e.g., n-nonyl 2-ethyl hexyl benzene); polyphenyls (e.g., biphenyls and terphenyls), alkyl biphenyl ethers, polymers of silicon (e.g., tetraethyl silicate, tetraisopropyl silicates, tetra(4-methyl-2-tetraethyl) silicate, hexyl (4-methyl-2-pentoxy) disiloxane, poly(methyl) siloxane, poly(methylphenyl) siloxane, etc.) Synthetic oils of the alkylene oxide-type polymers which may be used include those exemplified by the alkylene oxide polymers.

The above base oils may be used individually or in combinations thereof, wherever miscible or wherever made so by the use of mutual solvents.

The reaction temperatures used in the treatment of the alkanes described hereinabove by the anhydrous aluminum chloride is in the range of 2° C. to about 50° C. to as high as 150° C., preferably from about 2° C. to 50° C.

The new V.I. improving agents described herein can be used in lubricating oil compositions in amounts of 1% to 20%, by weight.

The new viscosity index improving agents of this invention can be prepared by treating an alpha, omega-diaryl alkane with from 8 mol percent to 80 mol percent of anhydrous aluminum chloride, based on the alpha, omega-diaryl alkane, at temperatures ranging from 2° C. to about 50° C. or higher, after which the mixture is agitated for a period of 2 to 48 hours or more at the same temperature. The mixture is then allowed to stand until the temperature reaches room temperature, after which the mixture is agitated for another period of time from 2 to 12 hours or more. The whole mixture can then be left to stand at room temperature for a time sufficient to permit a clear separation into 2 phases. The liquid is then decanted from the aluminum chloride, blended with benzene, and washed with dilute hydrochloric acid, sodium bicarbonate and water. The resulting benzene solution is then heated to remove the benzene by distillation, and to recover the reaction products.

The examples set forth hereinbelow exemplify the various conditions under which the reaction product which is useful as a viscosity index improving agent may be obtained.

EXAMPLE I

*Viscosity Index Improving Agent Obtained by Aluminum Chloride Treatment of 1,9-Diphenylnonane*

A mixture of 140 grams (0.5 mol) of 1,9-diphenylnonane, 2 cc. of chloroform (0.025 mol), and 5 grams of anhydrous aluminum chloride (0.038 mol) was agitated rapidly at a temperature of about 70° C. for a period of 6 hours. 1.5 grams of anhydrous aluminum chloride (0.013 mol) was added, after which the whole mixture was agitated for another 10 hours at the same temperature, followed by gradual cooling to room temperature; after which the mixture was agitated for 12 hours, followed by standing at room temperature for a period of 18 hours during which time 2 layers formed. After decantation from aluminum chloride, each layer was blended with benzene, washed with dilute hydrochloric acid, sodium bicarbonate and water. After water washing, the products were filtered and the benzene was removed by distillation. The aluminum chloride treatment thus yielded 2 fractions having the following properties:

|  | Upper Fraction | Lower Fraction |
|---|---|---|
| $\eta$D | 1.5346 | 1.5370 |
| Viscosity at 100°F. (cs.) | 49 | 582 |
| Viscosity at 210°F. (cs.) | 8.7 | 45 |
| V.I. | 143 | 117 |
| Pour Point, °F | −58 | +10 |

The upper fraction, which included unreacted 1,9-diphenylnonane, had greatly improved V.I. characteristics, showing an in situ formation of a V.I. improving agent.

The addition of 20%, by weight, of the lower fraction to 1,9-diphenylnonane, yielded a composition having a V.I. of 168. A 10% solution yielded a composition having a V.I. of 150.

The original 1,9-diphenylnonane has the following properties:

Boiling point (at 0.4 mm. Hg), °C _____ 172
Boiling point (at 1.0 mm. Hg), °C _____ 184–190
R.I. $\eta$D _____ 1.5290
Viscosity at 100° F. (cs.) _____ 8.00
Viscosity at 210° F. (cs.) _____ 2.350
V.I. _____ 124
Pour point, °F _____ About +20
$d_4^{20}$ _____ 0.9358

EXAMPLE II

*Viscosity Index Improving Agent Obtained by Aluminum Chloride Treatment of 1,9-Diphenylnonane*

A mixture of 140 grams (0.5 mol) of 1,9-diphenylnonane, 2 cc. of chloroform, and 7 grams (0.053 mol) of anhydrous aluminum chloride was agitated violently at a temperature of about 110° C. for a period of 8 hours, after which the whole mixture was allowed to stand at room temperature overnight. 1.5 grams of anhydrous aluminum chloride was added, and the mixture was agitated at about 110° C. for a period of 4 hours, followed by standing at room temperature for a period of 18 hours. After decantation of the liquid from the aluminum chloride, the liquid was blended with diethylether, washed with dilute hydrochloric acid, sodium bicarbonate and water. After water washing, the product was filtered, and the product was distilled to remove the diethylether, a low boiling distillate, unreacted nonane, and to recover the reaction products. The distillation was carried out to a bottoms temperature of 380° C. at an absolute pressure of 1.4 mm. Hg. The aluminum chloride treatment described in this example yielded approximately 31%, by weight, of a distilled fraction No. 1, which was identified as unreacted 1,9-diphenylnonane; 23% of a fraction No. 2; and 46%, by weight, of a bottoms fraction characterized as follows:

|  | Fraction 2 | Bottoms |
|---|---|---|
| Boiling Pt., °C. (at 1.25 mm. Hg) | 306–323 |  |
| Viscosity at 100° F. (cs.) | 83 | 987 |
| Viscosity at 210° F. (cs.) | 10.3 | 56.7 |
| Pour Point, °C | −20 |  |
| V.I. | 113 | 110 |
| Mol Wt.: |  |  |
| Theory | [1] 483 | [2] 886 |
| Found | 468 | 847 |

[1] Calculated for:

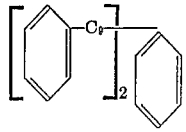

[2] Calculated for a polyalkyl aromatic material having an average of 5 benzene rings, including:

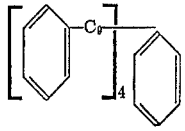

EXAMPLE III

*Viscosity Index Improving Agent Obtained by Aluminum Chloride Treatment of 1,9-Diphenylnonane*

A mixture of 140 grams (0.5 mol) of 1,9-diphenylnonane, 2 cc. of chloroform (0.025), and 5 grams (0.038 mol) of anhydrous aluminum chloride was agitated violently at a temperature of 2–5° C. for a period of 2 hours. 1.5 grams of anhydrous aluminum chloride (0.013 mol) was added, after which the whole mixture was agitated for another 2 hours at the same temperature, followed by gradual warming to room temperature. After the mixture had been agitated for 2 hours, it was allowed to stand at room temperature for a period of about 18 hours. After decantation of the liquid from the aluminum chloride the liquid was blended with benzene, washed with dilute hydrochloric acid, sodium bicarbonate, and water. After water washing, the product was filtered and heated to remove the benzene and unreacted 1,9-diphenylnonane by distillation to a bottoms temperature of 343° C. at an absolute pressure of 0.5 mm. Hg. The bottoms fraction, which represented approximately 35% of the original charge of nonane, had the following properties:

$\eta$D _____ 1.5394
Viscosity at 100° F. (cs.) _____ 76.77
Viscosity at 210° F. (cs.) _____ 11.65
V.I. _____ 134

For the purpose of determining the viscosity-improving characteristics of the product of Example III, the bottoms thus obtained were incorporated into 1,9-diphenylnonane (unreacted) to make a composition containing 34% bottoms plus 66% of 1,9-diphenylnonane. The resulting blend had a viscosity Index of 159. This V.I. of 159 represents an increase of 35 points, since the original 1,9-diphenylnonane (as set forth in the data of Example I) had a V.I. of 124.

EXAMPLE IV

*Viscosity Index Improving Agent Obtained by Aluminum Chloride Treatment of 1,9-Diphenylnonane*

A mixture of 140 grams (0.5 mol) of 1,9-diphenylnonane, 2 cc. of chloroform (0.025), and 5 grams (0.038 mol) of anhydrous aluminum choride was agitated violently at a temperature of 2–5° C. for a period of 2 hours. 1.5 grams of anhydrous aluminum chloride (0.013 mol) was added, after which the whole mixture was agitated for another 2 hrs. after which it was allowed to stand at room temperature for a period of about 18 hours. After decantation of the liquid from the aluminum chloride the liquid was blended with benzene, washed with dilute hydrochloric acid, sodium bicarbonate, and water. After water washing, the product was filtered and heated to remove the benzene and unreacted 1,9-diphenylnonane by distillation to a bottoms temperature of 320° C. at an absolute pressure of 0.5 mm. Hg. The bottoms fraction, which represented approximately 35% of the original charge of nonane, had the following properties:

| | |
|---|---|
| $\eta D$ | 1.5411 |
| Viscosity at 100° F. (cs.) | 110.0 |
| Viscosity at 210° F. (cs.) | 14.4 |
| V.I. | 134 |

The bottoms fraction from Example IV, in a concentration of 33%, increases the V.I. of a California solvent refined naphthenic base mineral lubricating oil from 90 to 119.

The new compositions of matter obtained by the AlCl₃ treatment of alpha, omega-diphenyl alkanes as described herein may be represented by the following formula:

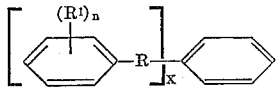

wherein R is a saturated hydrocarbon radical having from 6 to 12 carbon atoms, R¹ is a saturated hydrocarbon radical having from 1 to 4 carbon atoms; $n$ is a number from 0 to 3 and X is a number from 2 to 6 or higher, wherein the average value for X is from 2 to 6, as further described and exemplified hereinabove.

I claim:
1. A lubricating oil composition comprising a major proportion of an oil of lubricating viscosity and, in an amount sufficient to improve the viscosity index thereof, an agent of the formula:

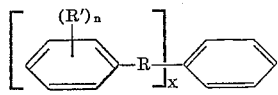

wherein R is a saturated hydrocarbon radical having from 6 to 12 carbon atoms, R′ is a saturated hydrocarbon radical having from 1 to 4 carbon atoms, $n$ is a number from 0 to 3, and X is a number from 2 to 6 wherein one of the phenyl radicals is attached to the R radical at the alpha carbon atom and the other phenyl radical is attached to the R radical at the omega carbon atom.

2. A lubricating oil composition comprising a major proportion of an oil of lubricating viscosity, and from 1% to 20%, by weight, of a viscosity index improving agent of the formula:

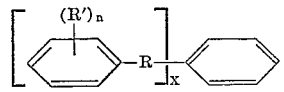

wherein R is a saturated hydrocarbon radical having from 6 to 12 carbon atoms, R′ is a saturated hydrocarbon radical having from 1 to 4 carbon atoms, $n$ is a number from 0 to 3, and X is a number from 2 to 6 wherein one of the phenyl radicals is attached to the R radical at the alpha carbon atom and the other phenyl radical is attached to the R radical at the omega carbon atom.

3. The lubricating oil composition of claim 2 wherein said oil of lubricating viscosity is a petroleum oil.

4. A lubricating oil composition comprising a major proportion of an oil of lubricating viscosity, and, in an amount sufficient to improve the viscosity index thereof, an agent of the formula

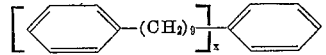

wherein $x$ is a number from 2 to 6.

5. The lubricating oil composition of claim 4, wherein $x$ is a number having a value of 2.

6. The lubricating oil composition of claim 4, wherein $x$ is a number having a value of 4.

References Cited in the file of this patent
UNITED STATES PATENTS

| 2,231,248 | Bowden | Feb. 11, 1941 |
| 2,548,982 | Kemp | Apr. 17, 1951 |